US009442650B2

(12) United States Patent
Sheik-Nainar

(10) Patent No.: US 9,442,650 B2
(45) Date of Patent: Sep. 13, 2016

(54) SYSTEMS AND METHODS FOR DYNAMICALLY MODULATING A USER INTERFACE PARAMETER USING AN INPUT DEVICE

(71) Applicant: SYNAPTICS INCORPORATED, Santa Clara, CA (US)

(72) Inventor: Mohamed Ashraf Sheik-Nainar, Cupertino, CA (US)

(73) Assignee: Synaptics Incorporated, San Jose, CA (US)

(*) Notice: Subject to any disclaimer, the term of this patent is extended or adjusted under 35 U.S.C. 154(b) by 363 days.

(21) Appl. No.: 13/804,392

(22) Filed: Mar. 14, 2013

(65) Prior Publication Data

US 2013/0257769 A1 Oct. 3, 2013

Related U.S. Application Data

(60) Provisional application No. 61/619,344, filed on Apr. 2, 2012.

(51) Int. Cl.
*G06F 3/0488* (2013.01)

(52) U.S. Cl.
CPC ......... *G06F 3/0488* (2013.01); *G06F 3/04883* (2013.01)

(58) Field of Classification Search
CPC ............. G06F 3/0488; G06F 3/04883; G11B 27/034; G11B 27/34
See application file for complete search history.

(56) References Cited

U.S. PATENT DOCUMENTS

| 6,072,474 | A  | * | 6/2000  | Morimura et al. ........... 345/173 |
| 6,388,655 | B1 |   | 5/2002  | Leung |
| 6,492,979 | B1 |   | 12/2002 | Kent et al. |
| 6,765,559 | B2 |   | 7/2004  | Hayakawa |
| 6,940,494 | B2 |   | 9/2005  | Hoshino et al. |
| 7,683,889 | B2 |   | 3/2010  | Rimas Ribikauskas et al. |
| 7,952,566 | B2 |   | 5/2011  | Poupyrev et al. |
| 2006/0284858 | A1 | | 12/2006 | Rekimoto |
| 2008/0024454 | A1 | | 1/2008  | Everest |
| 2009/0046110 | A1 | | 2/2009  | Sadler et al. |
| 2009/0160793 | A1 | | 6/2009  | Rekimoto |

(Continued)

FOREIGN PATENT DOCUMENTS

KR     20010046646 A    *  6/2001

OTHER PUBLICATIONS

The International Bureau of WIPO, International Preliminary Report on Patentability in International Application No. PCT/US2013/034408, mailed Oct. 16, 2014.

(Continued)

*Primary Examiner* — Aneeta Yodichkas
*Assistant Examiner* — Richard Hong
(74) *Attorney, Agent, or Firm* — Osha Liang LLP

(57) ABSTRACT

The embodiments described herein provide devices and methods that facilitate improved input device performance. Specifically, the devices and methods provide an input device configured to determine positional and force information for input objects interacting with a sensing region. The system is configured to detect a variable force imparted to an input surface of the sensing region by at least one input object. The variable force dynamically modulates, within a modulation range, a user interface parameter. The dynamic modulation of the interface parameter is modified in response to an additional input object contacting the input surface.

21 Claims, 14 Drawing Sheets

(56) References Cited

U.S. PATENT DOCUMENTS

| | | |
|---|---|---|
| 2009/0201261 A1 | 8/2009 | Day |
| 2009/0237374 A1 | 9/2009 | Li et al. |
| 2010/0097332 A1 | 4/2010 | Arthur et al. |
| 2010/0110018 A1 | 5/2010 | Faubert et al. |
| 2010/0253645 A1 | 10/2010 | Bolender |
| 2010/0302153 A1 | 12/2010 | Jung et al. |
| 2011/0012760 A1 | 1/2011 | Klinghult |
| 2011/0050588 A1 | 3/2011 | Li et al. |
| 2011/0141052 A1 | 6/2011 | Bernstein et al. |
| 2011/0141053 A1 | 6/2011 | Bulea et al. |
| 2011/0205182 A1 | 8/2011 | Miyazawa et al. |
| 2011/0239155 A1 | 9/2011 | Christie |
| 2011/0278078 A1 | 11/2011 | Schediwy et al. |
| 2011/0285666 A1 | 11/2011 | Poupyrev et al. |
| 2012/0068760 A1 | 3/2012 | Caldwell et al. |

OTHER PUBLICATIONS

The International Bureau of WIPO, International Preliminary Report on Patentability in International Application No. PCT/US2013/034656, mailed Oct. 16, 2014.

International Searching Authority, International Search Report and Written Opinion for International Application No. PCT/US2013/034408, mailed Aug. 12, 2013.

International Searching Authority, International Search Report and Written Opinion for International Application No. PCT/US2013/034656, mailed Sep. 12, 2013.

* cited by examiner

[0001] In contrast, absolute capacitance sensing methods, sometimes referred to as "self capacitance", are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground) to generate resulting signals on the sensor electrodes. In this case, the resulting signals received on a sensor electrode are generated by the modulation of that same sensor electrode. The resulting signals for absolute capacitive sensing thus comprise the effects of modulating the same sensor electrode, the effects of proximate conductive input objects, and the effects of and/or to one or more sources of environmental interference. Thus, by analyzing the resulting signals on the sensor electrodes the capacitive coupling between the sensor electrodes and input objects may be detected.

FIG. 10

[0001] In contrast, absolute capacitance sensing methods, sometimes referred to as "self capacitance", are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground) to generate resulting signals on the sensor electrodes. In this case, the modulation of that same sensor electrode. The resulting signals for absolute capacitive sensing thus comprise the effects of modulating the same sensor electrode, the effects of proximate conductive input objects, and the effects of and/or one or more sources of environmental interference. Thus, by analyzing the resulting signals on the sensor electrodes the capacitive coupling between the sensor electrodes and input objects may be detected.

FIG. 11

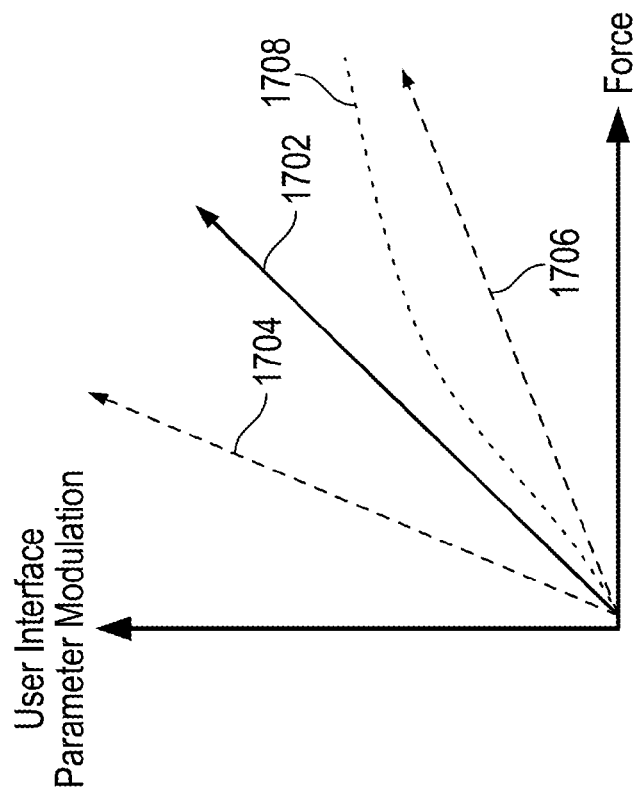
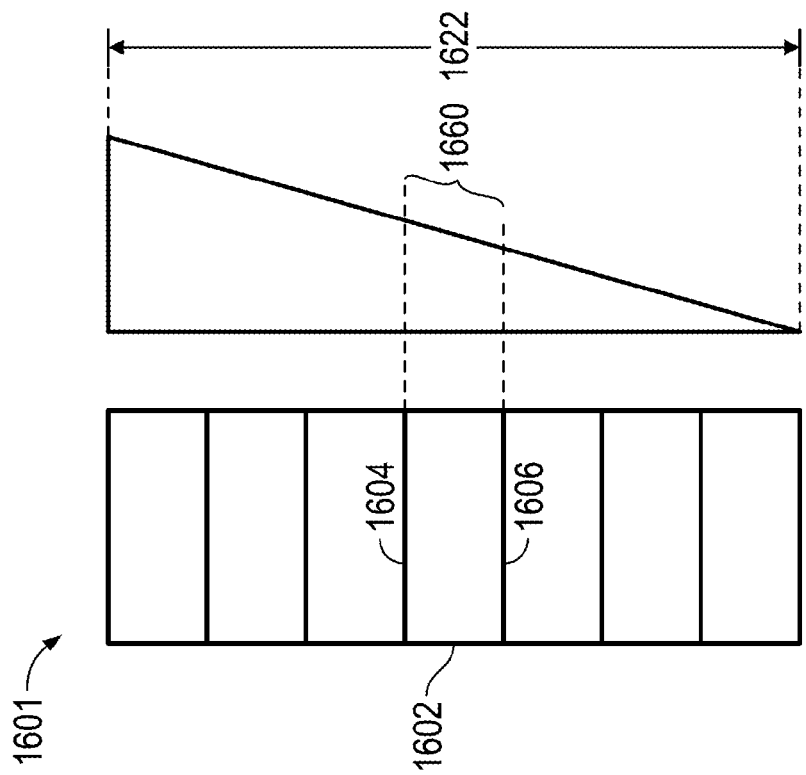
FIG. 17
FIG. 16

SYSTEMS AND METHODS FOR DYNAMICALLY MODULATING A USER INTERFACE PARAMETER USING AN INPUT DEVICE

PRIORITY CLAIM

This application claims priority to U.S. Provisional Patent Application Ser. No. 61/619,344, filed Apr. 2, 2012.

FIELD OF THE INVENTION

This invention generally relates to electronic devices, and more specifically relates to input devices for dynamically modulating user interface parameters using position and force information for input objects.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers, or as transparent sensor devices integrated with display screens to provide a touch screen interface).

In various usage scenarios involving force enabled touchpads and touchscreens, one or more user inputs (typically fingers) are used to control or modulate an interface action (on the display for example) based on the level of force imparted by the inputs. In this context, a modulated user interface parameter is any parameter that has a range of modulation (adjustment), or a gradient of continuous values or states that can be mapped versus applied force.

Presently known systems disclose using greater or lesser applied force to dynamically modulate various user interface elements such as scrolling, audio volume, zoom, audio/video fast forward/rewind, browser history review, and the like. These systems are lacking, however, in their ability determine when a force modulated action is complete; that is, current approaches cannot reliably convey to the system that the modulated parameter (e.g., scrolling, audio volume) has reached the desired level.

For example, when applied force from an input object dynamically controls zooming in and zooming out of an image, how does the user lock in or maintain the then current zoom level seen on the display screen? That is, how does a user inform the system that "this is the point of modulation I now wish to preserve for subsequent interaction"? If the user lifts his finger, the discontinuous change in force may default back to the original zoom level or perform some additional modulation that is not desired by the user. Previous solutions have employed "press and hold for a time out" and "quick press to confirm" techniques to lock in the desired level, but these approaches can be cumbersome and physically challenging.

Improved systems and methods are thus needed which satisfactorily address the foregoing shortcomings.

BRIEF SUMMARY OF THE INVENTION

Various embodiments of the present invention provide devices and methods that facilitate improved input device performance. The devices and methods provide improved ability to preserve or "lock-in" a current level of modulation. Systems and methods are further provided for remapping the dynamic force range to the entirety of or, alternatively, to a desired sub-region of the modulated spectrum.

Specifically, various techniques are provided for locking an interface parameter at a desired state or level of modulation, as defined by the force input. The "locking" or "end force control" action may be triggered by an additional input to the input surface, such as by touching the input surface with a second finger while maintaining contact with a first finger.

Once the modulated parameter is locked, the system can either stop modulating and maintain the locked in value, or continue modulating using the locked in value as a new starting point. For example, the entire dynamic force range (or a portion thereof) can be mapped to a modulation region above the locked value, below the locked value, or to an intermediate (e.g., mid-level) region which includes the locked in value.

Other desirable features and characteristics will become apparent from the subsequent detailed description and the appended claims, taken in conjunction with the accompanying drawings and the foregoing technical field and background.

BRIEF DESCRIPTION OF DRAWINGS

The preferred exemplary embodiment of the present invention will hereinafter be described in conjunction with the appended drawings, where like designations denote like elements, and:

FIG. 10 is a graphical illustration of a nudging technique for directionally selecting a portion of text extending up and to the left from a force application reference point in accordance with an embodiment of the invention;

FIG. 11 is an alternative embodiment of the nudging technique of FIG. 10, for directionally selecting a portion of text extending up and to the right from a force application reference point in accordance with an embodiment of the invention;

FIG. 16 is a schematic depiction of a user interface parameter modulation spectrum having a greater spectrum extent than that shown in FIG. 15, juxtaposed with a corresponding schematic depiction of a dynamic force range in accordance with an embodiment of the invention;

FIG. 17 is a plot of applied force versus user interface parameter modulation for unity gain, greater than unity gain, less than unity gain, and non-linear gain in accordance with various embodiments of the invention;

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

The present disclosure relates to techniques for locking a user interface parameter at a desired state or level of modulation, as defined by the corresponding force input which controls the modulation. Specifically, the "locking" or "end force control" action may be triggered by an additional input to the input surface, such as by touching the input surface with a second finger while maintaining contact with a first finger.

Once the modulated parameter is locked, the system can either stop modulating and maintain the locked in value, or continue modulating using the locked in value as a new starting point. For example, the entire dynamic force range can be mapped to the modulation region above the locked value, below the locked value, or at a mid-range which includes the locked value. Similarly to the manner in which a modulated parameter is locked, the dynamic force range may also have a "latch". A latched force value can be used a threshold, in that a latched force value having some dynamic force range above and below the latched value may exhibit different responses on a modulated parameter depending on whether the input force is above or below the latched value.

Figure 1:
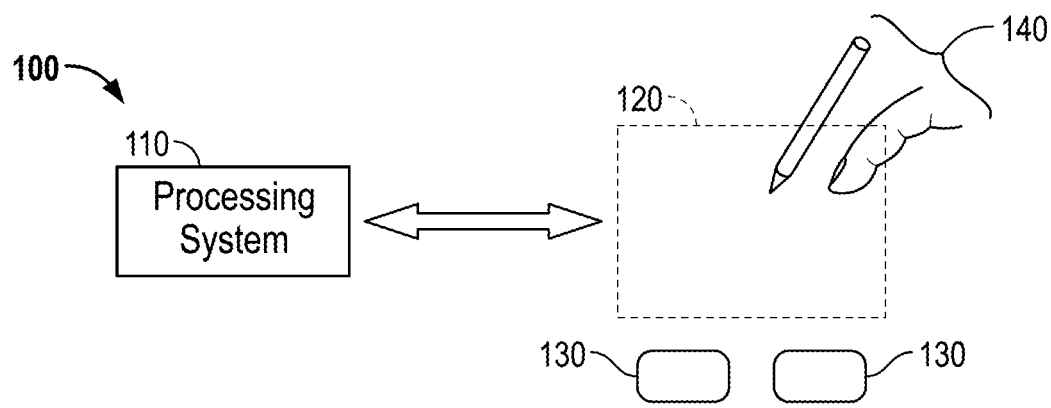
FIG. 1 is a block diagram of an exemplary electronic system that includes an input device and a processing system in accordance with an embodiment of the invention.

Various embodiments of the present invention provide input devices and methods that facilitate improved usability, including the aforementioned modulation schemes. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches.

Further exemplary electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, SMBus, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof.

In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 also includes one or more force sensors that are coupled to a surface below the sensing region 120 and the processing system 110, and configured to provide force values that are indicative of force applied to the input surface. The input device 100 utilizes capacitive sensing to detect user input in the sensing region 120. To facilitate capacitive sensing, the input device 100 comprises one or more sensing electrodes for detecting user input (not shown in FIG. 1).

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "transcapacitive" sensing methods. Transcapacitive sensing methods, sometimes referred to as "mutual capacitance", are based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, one or more conductive input objects, and/or to one or more sources of environmental interference (e.g. other electromagnetic signals). Sensor electrodes may be dedicated transmitters or receivers, or may be configured to both transmit and receive.

In contrast, absolute capacitance sensing methods, sometimes referred to as "self capacitance", are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground) to generate resulting signals on the sensor electrodes. In this case, the resulting signals received on a sensor electrode are generated by the modulation of that same sensor electrode. The resulting signals for absolute capacitive sensing thus comprise the effects of modulating the same sensor electrode, the effects of proximate conductive input objects, and the effects of and/or to one or more sources of environmental interference. Thus, by analyzing the resulting signals on the sensor electrodes the capacitive coupling between the sensor electrodes and input objects may be detected.

Notably, in transcapacitive sensing the resulting signals corresponding to each transmission of a transmitter signal are received on different sensor electrodes than the transmitter electrode used to transmit. In contrast, in absolute capacitive sensing each resulting signal is received on the same electrode that was modulated to generate that resulting signal.

In FIG. 1, processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described above, the processing system 110 may include the circuit components for operating the plurality of sensor electrodes to generate images of sensor values indicative of objects in a sensing region proximate to an input surface, and may also include circuit components to operate at least one force sensor to generate force values indicative of force applied to an input surface.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit.

As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

Figure 2:
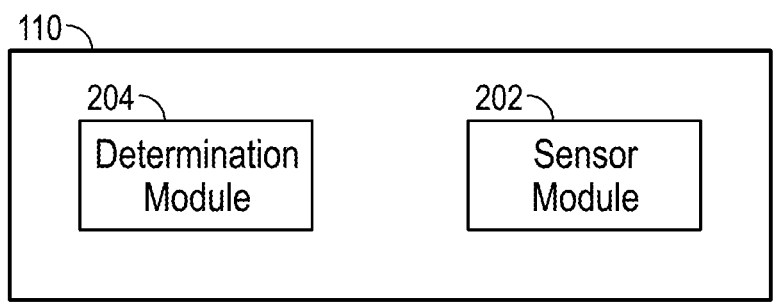
FIG. 2 is a schematic view of an exemplary processing system that includes a sensor module and a determination module in accordance with an embodiment of the invention.

Referring now to FIG. 2, the processing system 110 may be implemented as a set of modules that handle different functions of the processing system 110, such as a sensor module 202 and a determination module 204. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information.

Further exemplary modules include sensor operation modules configured to operate sensing element(s) and a determination module. In accordance with the embodiments described herein, the sensor module may be configured to operate the plurality of sensor electrodes to generate images of sensor values indicative of objects in a sensing region proximate to an input surface at a first rate. The sensor module may be further configured to operate at least one force sensor to generate force values indicative of force applied to the input surface at a second rate. In one embodiment, the determination module is configured to determine if an input object detected in a first image of sensor values and an input object detected in a second image of sensor values remained in contact with the input surface between the first image and the second image based at least in part on the force values.

In another embodiment, the determination module may be configured to determine an initial contact location for an input object first detected in a first image of sensor values based at least in part on at least one force value preceding the first image of sensor values and the first image of sensor values. In either case such a determination can disambiguate the positional information for the detected objects, and thus can be used to improve the accuracy and usability of the input device.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning.

As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes a determination module configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force values" as used herein is intended to broadly encompass force information regardless of format. For example, the force values can be provided for each object as a vector or scalar quantity. As other examples, the force information can also include time history components used for gesture recognition. As will be described in greater detail below, the force values from the processing systems may be used to disambiguate positional information for detected objects, and thus can be used to improve the accuracy and usability of the input device.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In general, the input device 100 facilitates improved performance. Specifically, the input device allows a user to modulate user interface parameters, lock in or latch a desired state of modulation, and resume modulation at the same or at a different region of the modulation spectrum, based on force and positional information of several input objects.

Figure 3:
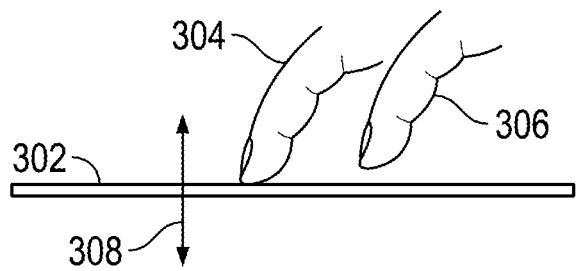
FIG. 3 is a schematic view of a first finger contacting a touch surface and a second finger immediately prior to contacting the surface in accordance with an embodiment of the invention.

Referring now to FIG. 3, a touch surface 302 associated with sensing region 120 (FIG. 1) is shown. In particular, a first input object 304 is shown contacting the touch surface 302, and a second input object 306 is shown just prior to or immediately subsequent to touching (or otherwise interacting with) the touch surface 302. In this context, each of the input objects may be a finger (which also contemplates a thumb), either extending from the same hand or from different hands of a user. As discussed in greater detail below, the first finger 304 controls an interface parameter (e.g., zoom, volume) by applying a variable force to the touch surface (along the direction of arrow 308). When the desired level of modulation is achieved, the user touches the surface 302 with a second finger 306 (referred to herein as the additional input object) to thereby interrupt modulation and preserve the then current state of the interface parameter.

Figure 4:
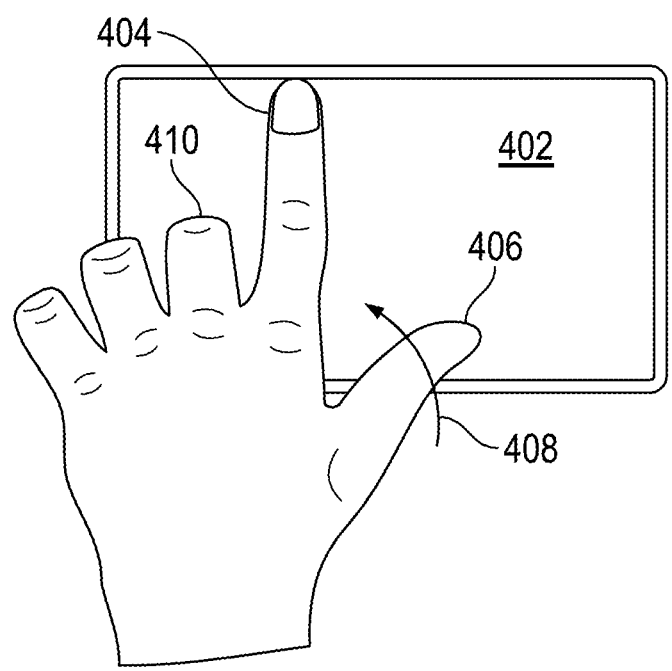
FIG. 4 is a schematic top view of a first (index) finger contacting a touch surface and a second finger (thumb) interacting with the touch surface in accordance with an embodiment of the invention.

Referring now to FIG. 4, the interface parameter may be controlled by applying pressure to the surface 402 from a first input object 404, whereupon the then current modulation state may be locked in by contacting the surface 402 with an additional input object 406. Subsequent interaction with the sensing region by either or both of the input objects (or by a third input object 410, if desired) may effect modulation in various ways such as by remapping the dynamic force range to all or a subset of the interface parameter modulation spectrum, as discussed in greater detail below.

Figure 5:
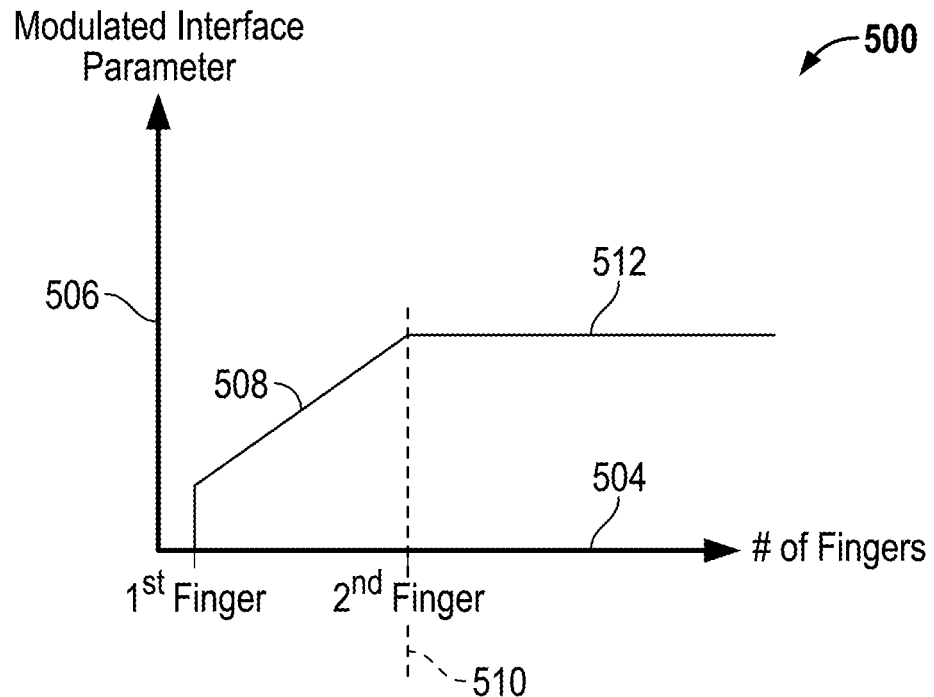
FIG. 5 is a plot of a first and an additional input object versus an exemplary modulated interface parameter in accordance with an embodiment of the invention.

FIG. 5 shows a graph of a first and an additional input object along a horizontal axis 504, versus a modulated interface parameter along a vertical axis 506. In the illustrated example, the state of the modulated parameter varies linearly along segment 508 with applied force from a first finger. When a second finger contacts the touch surface (indicated by event 510), the state of the modulated parameter remains constant along segment 512. Thus, the additional input object(s) contacting the touch surface locks the modulated parameter.

Figure 6:
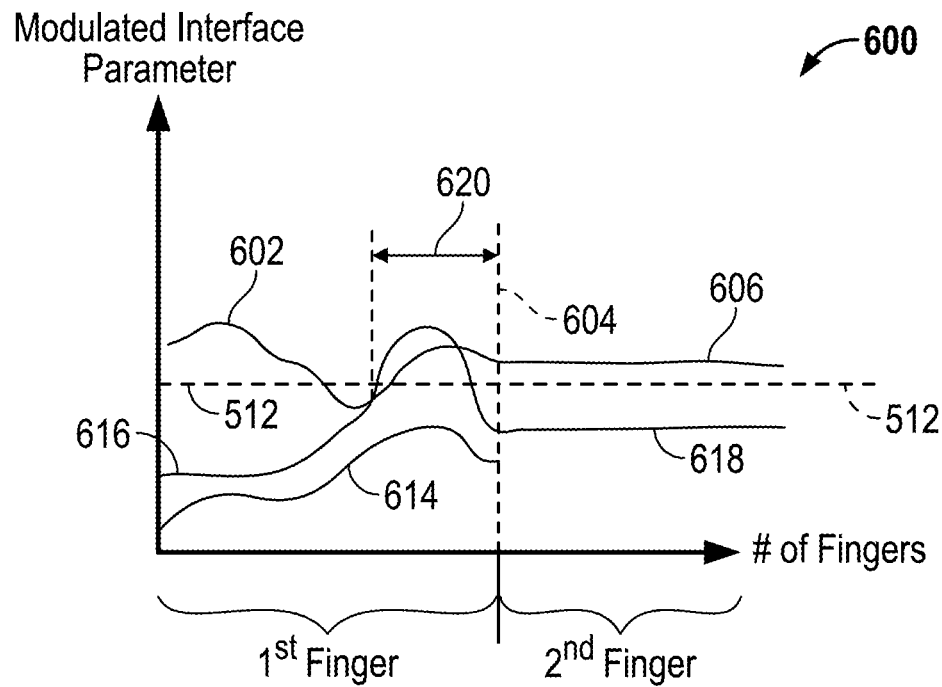
FIG. 6 is a plot of a first and a second finger versus an exemplary modulated interface parameter in accordance with an embodiment of the invention.

As a further illustration, FIG. 6 is a plot 600 of first and second fingers versus a modulated interface parameter. Note that in a first segment 602 corresponding to a first input object applying force to an input surface, the modulated parameter varies in virtually any desired manner in response to applied force. However, when the second finger contacts the touch surface the modulation is interrupted, remaining locked at the level at which the second finger contacted the surface.

As a further example, with reference to FIGS. 5 and 6, initial interaction with the input surface, as shown in FIG. 5 results in a locked modulated parameter. In some embodiments, the additional input object (indicated by event 510) may also latch a force value such that subsequent input to the touch surface does not modulate the interface parameter until the force of input meets the latch value. An example of this can be seen in FIG. 6. After the interaction described in FIG. 5 wherein an additional input locked the modulated interface parameter, the force value associated with the first finger during event 510 is used as a latch for subsequent interaction. Thus, when an input object applies a level of force (shown as segment 614) which does not meet the latched force value (shown as latch level 512), the modulated parameter remains locked at the previous state and does not change in response to applied force. However, when an input object apples a level of force (shown as segment 616) which does meet the latched force value (shown as latch level 512), modulation of the interface element resumes, during period 620, before contact to the input surface by an additional input locks the modulation to a new level (shown as segment 618).

In the context of the present disclosure, the term "user interface parameter" refers to virtually any parameter which may be controlled or otherwise manipulated through the application of force to an input surface. Several illustrative non-limiting examples will now be briefly described to augment the ensuing description.

Figure 7:
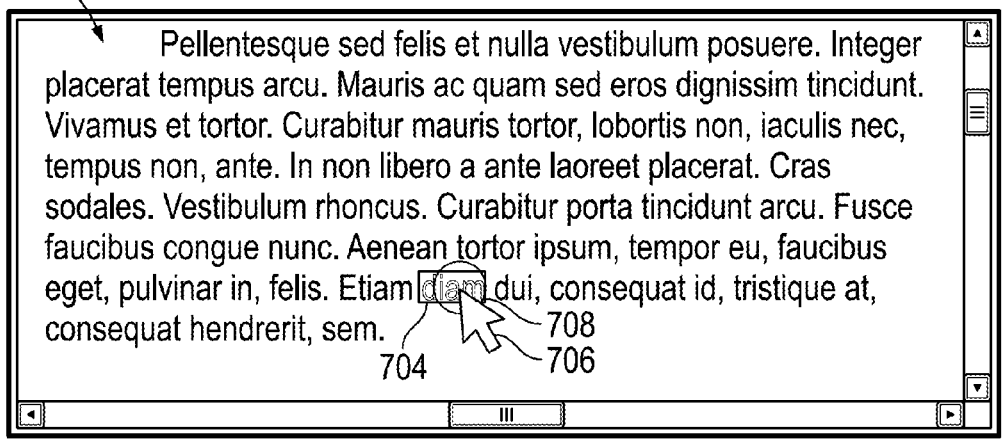
FIG. 7 is a graphical illustration of selecting text in a word processing application using a low level of force in accordance with an embodiment of the invention.
Figure 8:
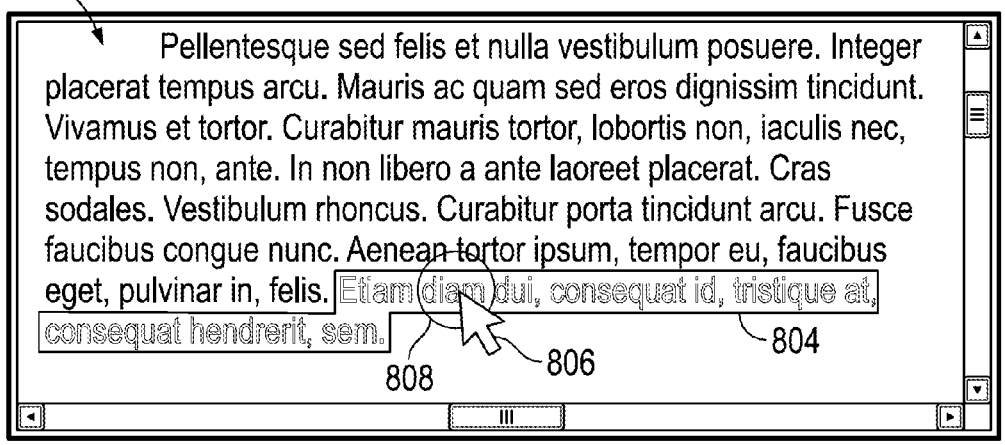
FIG. 8 is a graphical illustration of selecting text in a word processing application using a medium level of force in accordance with an embodiment of the invention.
Figure 9:
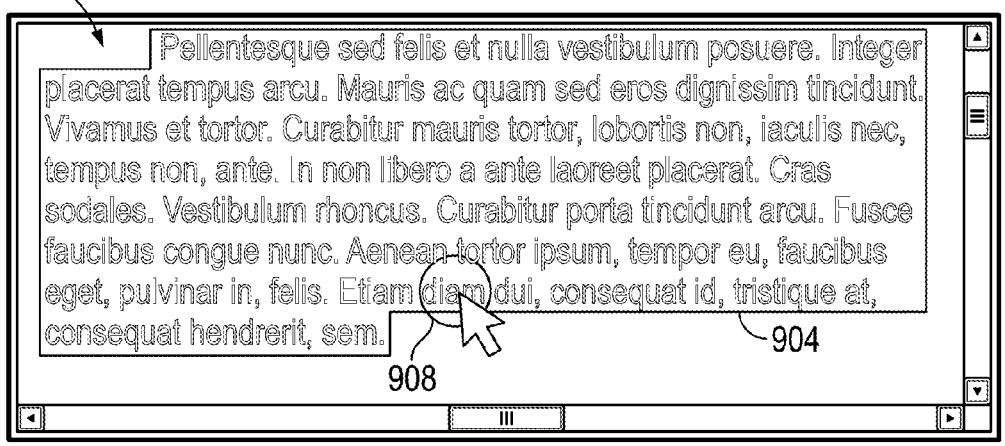
FIG. 9 is a graphical illustration of selecting text in a word processing application using a high level of force in accordance with an embodiment of the invention.

Referring now to FIGS. 7-9, one exemplary class of user interface parameters which may be modulated in accordance with the techniques disclosed herein surrounds text-based applications such as word processing. More particularly, FIG. 7 shows a string of text 702, such as might be displayed on a display screen associated with the input device 100. FIG. 7 also includes a cursor 706 representing a touch point (or region) where force is applied by an input object.

FIG. 7 further includes a graphical element 708 indicative of the magnitude of applied force. In embodiments where the touch screen overlaps the display, the physical point of force application may coincide with the actual location of the cursor 706; alternatively, the visual cursor may be offset from the point of application of applied force to permit viewing of the cursor in the presence of the input object. In FIG. 7, a relatively small amount of force is applied, indicated by a relatively small graphical element 708. As such, a correspondingly small amount of text is highlighted, for example, a single word 704.

FIG. 8 depicts a string of text 802 (which may be the same as string 702 for clarity), a highlighted portion 804 of the string 802, a cursor 806, and a graphical element 808. In the example shown in FIG. 8, a medium level of force is applied by the input object, represented by a medium sized graphical element 808. Note that element 808 is larger than element 708 to graphically convey the increased level of applied force. Consequently, a relatively larger amount of text is highlighted as a result of the applied force, for example, an entire sentence 804.

FIG. 9 depicts a string of text 902 (analogous to strings 702 and 802), highlighted portion 904 of the string 902, a cursor 906, and a graphical element 908. FIG. 9 depicts a relatively high level of applied force, indicated by a relatively large graphical element 908. Note that element 908 is larger than element 808 to graphically convey the increased level of applied force. Consequently, a relatively larger amount of text is highlighted as a result of the applied force, for example, an entire paragraph 904.

As seen in FIGS. 7-9, the dynamic force range is represented by the elements 708, 808, and 908, and includes a relatively small amount of force (FIG. 7) up to a relatively large amount of force (FIG. 9). The precise values for applied force and/or pressure may be configured as appropriate for any given application. By way of non-limiting example, a suitable dynamic force range may extend from 150 grams to 500 grams, or may contemplate any other convenient range. Note also that in the context of FIGS. 7-9, the modulated interface parameter may be characterized as a relative amount of highlighted text. In other embodiments, the modulated interface parameter may be characterized as font size, font type, the zoom level of a map or image, and so on.

Referring now to FIGS. 10 and 11, an alternative embodiment of a modulated user interface parameter is shown. In particular, FIG. 10 is a graphical illustration of a nudging technique for directionally selecting a portion of text using applied force having a directional component parallel to the touch surface. That is, the downward (perpendicular to the surface) component of the applied force determines the amount by which the interface parameter is modulated (as in FIGS. 7-9), and the component of the applied force parallel to the touch surface determines the direction of the modulation (e.g., left, right, up, and down in the plane of the touch surface).

FIG. 10 illustrates a text cell 1002 including a paragraph of text. Force is applied at a touch point (or touch region) 1004. By pressing one's finger downwardly and at the same time nudging the finger in the direction indicated by arrow 1005, the user parameter is modulated (e.g., the text is highlighted) in a direction extending upwardly and to the left from the force application reference point 1004. The magnitude of the modulation, i.e., the amount of highlighted text, is represented by the region 1006.

Similarly, FIG. 11 shows a cell 1102 including a paragraph of text. Force is applied at a touch point (or touch region) 1104 downwardly and simultaneously nudged along arrow 1105. As a result, the user parameter is modulated (e.g., the text is highlighted) in a direction extending upwardly and to the right from the force application reference point 1104. The amount of highlighted text corresponds to the magnitude of the modulation and is represented by the region 1106.

Figure 12:
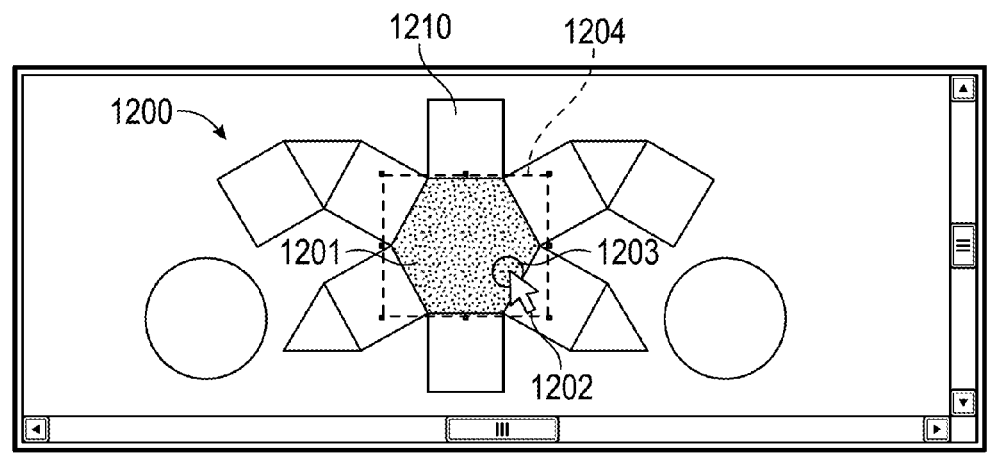
FIG. 12 is a graphical illustration of a technique for coloring, highlighting, or otherwise selecting a portion of a graphical image using light pressure in accordance with an embodiment of the invention.
Figure 13:
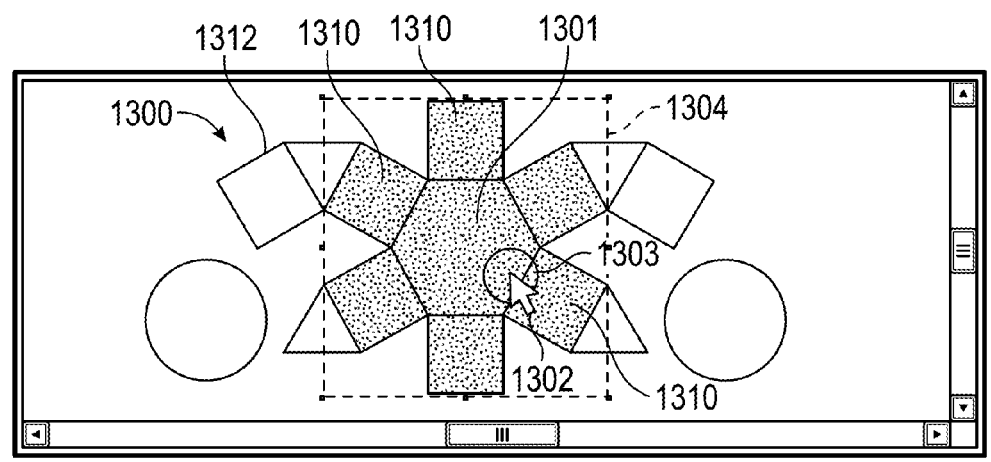
FIG. 13 is a graphical illustration of a technique for coloring, highlighting, or otherwise selecting a portion of a graphical image using moderate pressure in accordance with an embodiment of the invention.
Figure 14:
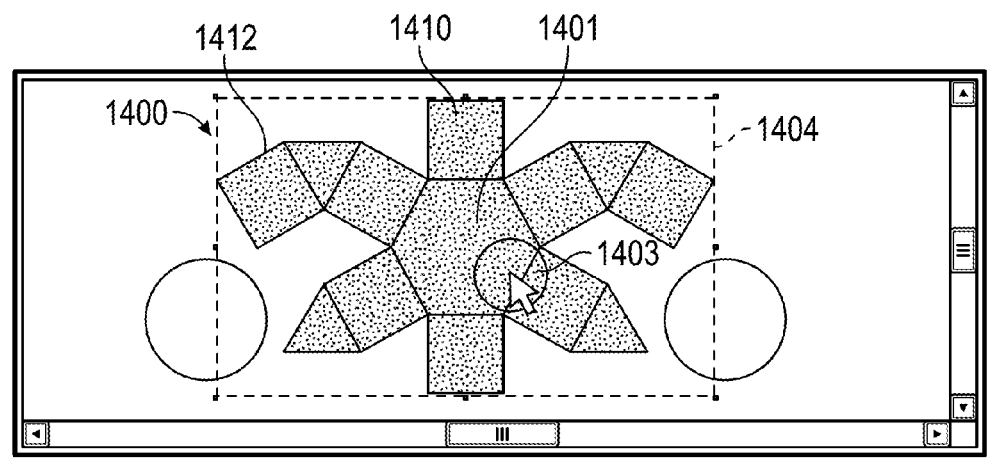
FIG. 14 is a graphical illustration of a technique for coloring, highlighting, or otherwise selecting a portion of a graphical image using high pressure in accordance with an embodiment of the invention.

FIGS. 12-14 illustrate another exemplary class of user interface parameters which may be modulated in accordance with the techniques disclosed herein, namely, applications involving coloring, highlighting, or otherwise selecting a portion of a graphical user interface using variable force. More particularly, FIG. 12 includes an image 1200 having respective segments 1201 and 1210. Force applied by an input object may be characterized by a cursor 1202 representing the location of the applied force, and an element 1203 representing the relative magnitude of the applied force. Because only a small amount of force is applied in FIG. 12, a correspondingly small portion of the image 1220 is modulated (highlighted), namely, segment 1201 located within a modulation zone 1204. Note that segment 1210 is not highlighted, inasmuch as it is located outside the modulation zone 1204.

FIG. 13 depicts an intermediate level of applied force, and includes an image 1300 having respective segments 1301, 1310, and 1312. The applied force is characterized by a cursor 1302 and an element 1303 representing an intermediate level of applied force. Consequently, a correspondingly larger portion of the image 1300 is modulated (highlighted), namely, segments 1301 and respective segments 1310 located within a modulated region 1304. Note that respective segments 1312 are not highlighted, inasmuch as they are located outside the intermediate modulation zone 1304.

FIG. 14 illustrates a relatively high level of applied force, and includes an image 1400 having respective segments 1401, 1410, and 1412. The applied force is similarly represented by a cursor 1302 and an element 1303 indicating magnitude. In response to the high level of applied force, a correspondingly larger portion of the image 1400 is modulated, namely, all of the segments 1401, 1410, and 1410 located within the modulated region 1404.

FIGS. 15(A)-15(E) are schematic depictions, respectively, of a user interface parameter modulation spectrum juxtaposed with a corresponding dynamic force range in accordance with various embodiments of the present disclosure. More particularly, FIG. 15(A) includes an exemplary modulation spectrum 1502 representing the range within which a user interface parameter may be controlled in response to applied force, such as zooming in and out of an image, highlighting text within a document, audio volume, video speed, scrolling, menu navigation, and the like.

Modulation spectrum 1502 includes a top boundary 1504, a bottom boundary 1506, an upper portion 1508, a middle portion 1510 having a sub-region 1514, and a lower portion 1512. Although spectrum 1502 may represent any modulated parameter, for purposes of this description spectrum 1502 will be described in the context of a mapping application. As such, spectrum 1502 may represent an object having 10 levels of "zoom" or detail, of which lower portion 1512 includes levels 1-5 (e.g., world to county), middle portion 1510 represents level 6 (e.g., city), and upper portion 1508 includes levels 7-10 (e.g., zip code to street level). Simply stated, modulation spectrum 1502 is a graphical representation of the range of modulation associated with any user interface parameter.

Figure 15B:
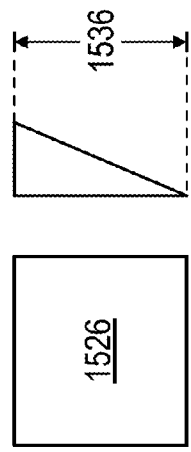
FIG. 15(B) is a schematic depiction of an upper portion of a user interface parameter modulation spectrum juxtaposed with a corresponding schematic depiction of a dynamic force range in accordance with an embodiment of the invention.
Figure 15C:
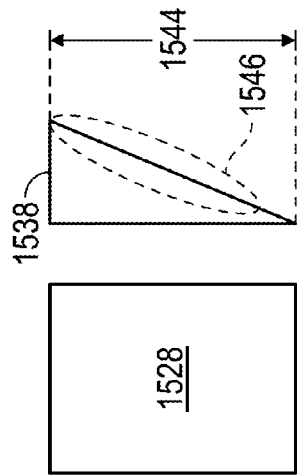
FIG. 15(C) is a schematic depiction of a lower portion of a user interface parameter modulation spectrum juxtaposed with a corresponding schematic depiction of a dynamic force range in accordance with an embodiment of the invention.
Figure 15E:
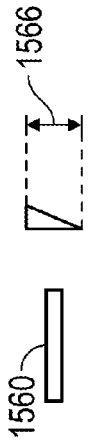
FIG. 15(E) is a schematic depiction of an intermediate portion of a user interface parameter modulation spectrum juxtaposed with a corresponding schematic depiction of a dynamic force range at a relatively higher resolution than that of FIG. 15(D) in accordance with an embodiment of the invention.
Figure 15A:
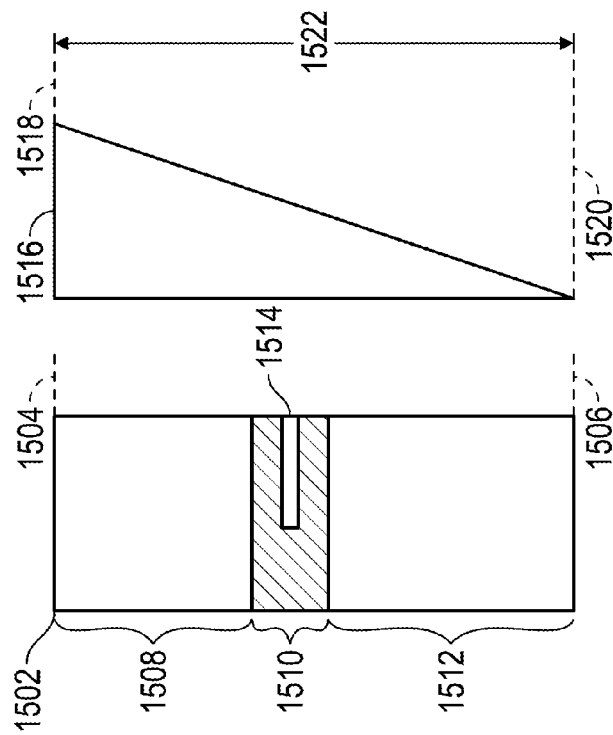
FIG. 15(A) is a schematic depiction of a user interface parameter modulation spectrum juxtaposed with a corresponding schematic depiction of a dynamic force range in accordance with an embodiment of the invention.

Juxtaposed to spectrum 1502 in FIG. 15(A) is an element 1516 representing a graphical depiction of a dynamic force range. In particular, element 1516 includes a high end boundary 1518 and a low end boundary 1520 defining a dynamic range 1522 extending therebetween. As shown in FIG. 15(A), the low end boundary 1520 represents the minimum amount of applied force needed to effect a change in the controlled interface parameter, and the high end boundary 1518 represents the maximum amount of applied force capable of effecting an incremental change on the controlled parameter, as defined by the system hardware and processing system.

In an embodiment, a graphical representation of a modulated spectrum may be placed on the display screen proximate a graphical depiction of a corresponding dynamic range symbol (analogous to that shown in FIG. 15(A)) to provide the user with a heuristic visual feedback mechanism illustrating the interplay between applied force and the modulated interface parameter.

As shown in FIG. 15(A), the entire dynamic force range 1522 may be mapped to the entire modulation spectrum of a controlled parameter, referred to herein to as one-to-one mapping; that is, the ratio (or rate of change) of the uncontrolled variable (the modulated parameter) versus the controlled variable (applied force) has a gain of one. FIGS. 15(B)-(E), on the other hand, depict mapping the entire dynamic force range to a subset of the modulation spectrum. Mapping the entire dynamic force range to less than the entire modulation spectrum of the controlled interface parameter results in a relatively lower gain, i.e., a gain of less than unity. In contrast, mapping less than the entire dynamic force range to a give modulation spectrum as shown in FIG. 16 (discussed in greater detail below) results in a gain of more than one.

Referring again to FIG. 15(B), the entire dynamic force range 1536 (analogous to range 1522) is mapped to a subset 1526 of a modulation spectrum (analogous to upper portion 1508 in FIG. 15(A). FIG. 15(C) shows the entire dynamic force range 1544 mapped to a lower subset 1528 of a modulation spectrum (analogous to lower portion 1512 in FIG. 15(A)). Note that while the force range elements are typically illustrated herein as having a linear response to applied force, FIG. 15(C) illustrates an alternative non-linear force response 1546.

Figure 15D:
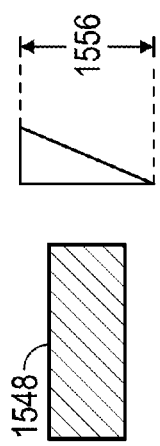
FIG. 15(D) is a schematic depiction of an intermediate portion of a user interface parameter modulation spectrum juxtaposed with a corresponding schematic depiction of a dynamic force range in accordance with an embodiment of the invention.

FIG. 15(D) shows the entire dynamic force range 1556 mapped to an intermediate portion 1548 of a modulation spectrum (analogous to middle portion 1510 in FIG. 15(A)). FIG. 15(E) shows the entire dynamic force range 1566 mapped to a sub-region 1560 (analogous to sub-region 1514 of FIG. 15(A)) of a modulation spectrum.

Referring now to FIG. 16, mapping less than the entire dynamic force range to a give modulation spectrum results in a greater than unity gain. More particularly, FIG. 16 depicts a user interface parameter modulation spectrum 1601 having a greater extent than spectrum 1502 of FIG. 15(A). That is to say, while spectrum 1502 may represent, for example, a map having a number of levels of detail, spectrum 1601 may represent a group of cells including a cell 1602 analogous to the map represented by spectrum 1502. In this example, cell 1602 includes an upper bound 1604 analogous to top boundary 1504, and a lower bound 1606 analogous to lower boundary 1506. In the illustrated example, the dynamic force range 1622 is the same as dynamic force range 1522 of FIG. 15(A); it can thus be seen that only a subset 1660 of force range 1622 is mapped to cell 1602, resulting in a significantly higher gain than that shown in FIG. 15(A) wherein the entire dynamic force range is mapped to a more limited range of modulation.

In partial summary, FIG. 17 is a plot 1700 mapping applied force versus user interface parameter modulation characterized by a one-to-one (unity) gain (indicated by line 1702), a gain greater than unity (indicated by line 1704), a gain less than unity (line 1706) and, for completeness, a non-linear gain represented by line 1708.

As discussed above in connection with, inter alia, FIGS. 1-6, once a desired state of an interface action has been achieved through applied force, the then current state of the modulated parameter may be maintained (temporarily locked) by detecting an additional input object contacting the touch surface. In order to facilitate this and related functionality, the input devices described herein are suitably configured to (1) determine a total force applied to the input surface, (2) determine force applied by each of a plurality of input objects based, for example, on force sensor data and positional information, and/or (3) determine force applied by each input based on a "force image" defining localized regions of applied force.

Moreover, the additional input object (and subsequent input objects) may exhibit one or both of a positional contact signature and a force contact signature. Exemplary positional contact signatures may include a contact without release; a tap; a tap and hold; a double tap; and a tap and drag. Exemplary force contact signatures may include a light tap; a light tap and hold; a heavy tap; and a heavy tap and hold.

In response to the additional input object exhibiting one or more of the foregoing positional or force contact signatures, the system may perform various desired actions in connection with the (now locked) user interface parameter. For example, the system may perform a "right click"-type operation such as presenting a menu of context specific options for interacting with the locked interface parameter, or reversing or re-mapping all or a portion of the modulated spectrum as described below in connection with FIGS. 18-26.

In addition, the positional and/or force profile of an additional or subsequent input may be used to lock and hold a particular modulation state or level, whereupon the entire dynamic force range (or a sub-region thereof) may my mapped to a subset of the modulation spectrum associated with the latch point.

Figure 18:
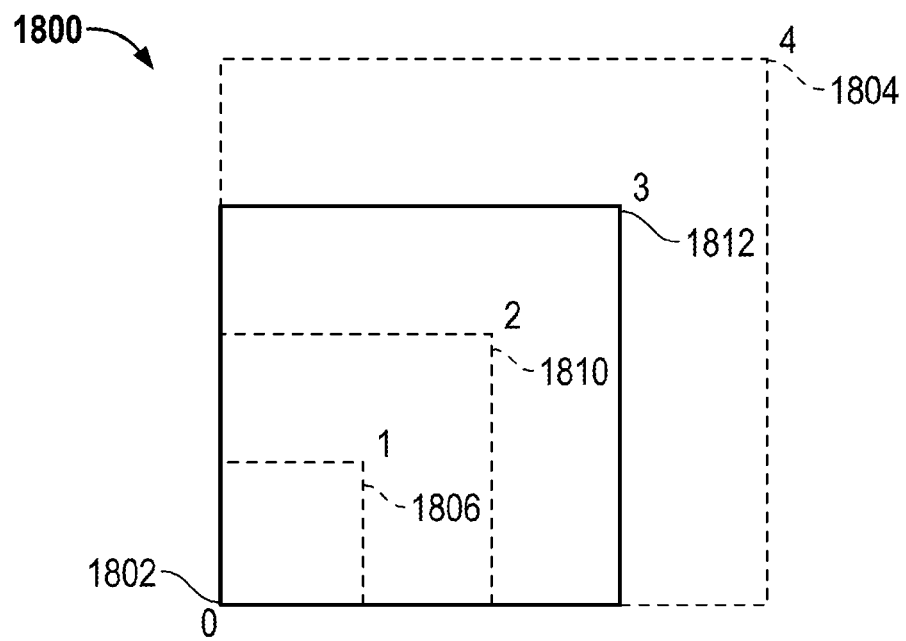
FIG. 18 is a graphical depiction of locking a modulated user interface parameter in a spatial domain in accordance with an embodiment of the invention.
Figure 19:
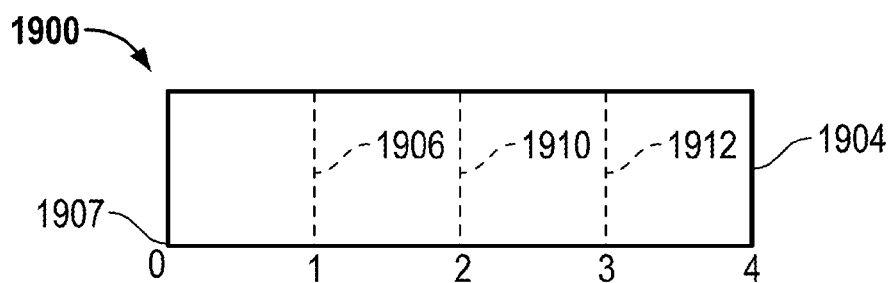
FIG. 19 is a graphical depiction of locking a modulated user interface parameter in a time domain in accordance with an embodiment of the invention.
Figure 20:
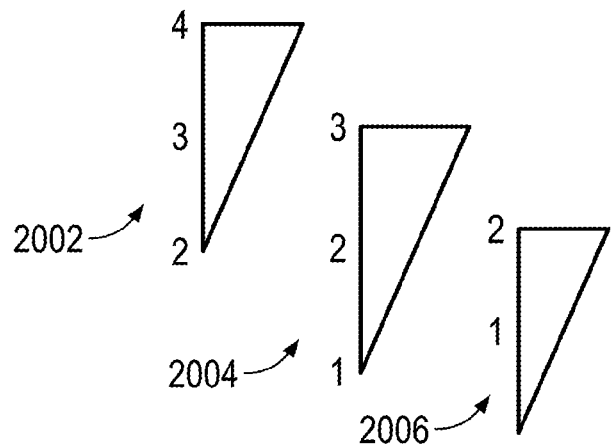
FIG. 20 is a graphical illustration of mapping a dynamic force range to corresponding locations within the modulation spectra of the user interface parameters shown in FIGS. 18 and 19 in accordance with an embodiment of the invention.

Referring now to FIGS. 18-20, FIG. 18 is a graphical depiction of a technique for locking a modulated user interface parameter in a spatial domain, FIG. 19 similarly depicts latching a modulated parameter in a time domain, and FIG. 20 graphically illustrates successive mapping of a given force range to corresponding sub-regions within the corresponding modulation spectra shown in FIGS. 18 and 19.

More particularly, FIG. 18 depicts a user interface parameter (e.g., a zooming application for a map) having a modulation spectrum 1800 ranging from a minimum value 1802 to a maximum value 1804, including intermediate states 1806, 1810, and 1812 interposed therebetween. In the illustrated example, states near the maximum level 1804 may correspond to a more global view, whereas states near the minimum level 1802 correspond to street level view. State 1812 represents an exemplary latched state.

Similarly, FIG. 19 shows a user interface parameter (e.g., a video scrubbing or browser history viewing application) having a modulation spectrum 1900 ranging from an initial value 1902 (e.g., a starting point) to an ending value 1904, with intermediate states 1906, 1910, and 1912 interposed therebetween. In the illustrated example, states near the beginning value 1902 may correspond to chronological states more remote in time, whereas states near the ending value 1904 may correspond to more recent chronological states.

In the embodiments shown in FIGS. 18 and 19, for example, it will be appreciated that a user may overshoot a desired modulation state. In that case, the user may increase or decrease applied pressure as necessary to achieve the desired modulation state, and then perform a locking operation to lock that state.

FIG. 20 graphically illustrates techniques for mapping a dynamic force range to sub-regions (e.g., sub-regions associated with latched locations) within the modulation spectra of the user interface parameters shown in FIGS. 18 and 19 in accordance with embodiments of the invention. Specifically, FIG. 20 illustrates mapping a force range 2002 to a sub-region of a modulation spectrum located near the maximum value 1804 of spectrum 1800 and near the most chronologically recent state 1904 of spectrum 1900. FIG. 20 further illustrates mapping a force range 2004 to respective intermediate sub-regions of modulation spectra 1800 and 1900. Finally, FIG. 20 illustrates mapping a force range 2006 to a sub-region of a modulation spectrum located near the minimum value 1802 of spectrum 1800 and near the chronologically remote state 1902 of spectrum 1900.

Figure 21:
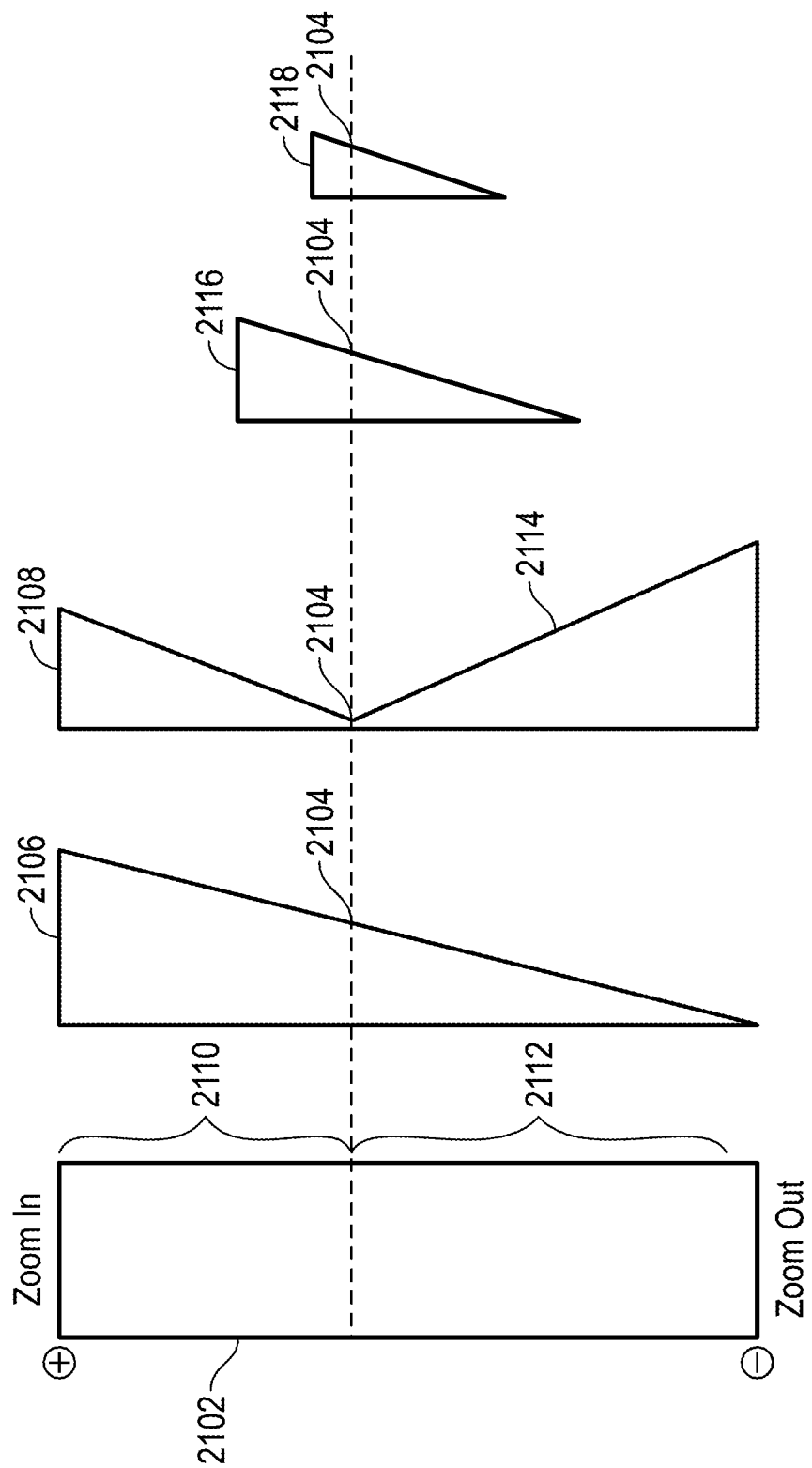
FIG. 21 is a graphical illustration of an interface modulation spectrum juxtaposed with various dynamic force range mapping schema in accordance with an embodiment of the invention.

FIG. 21 is a graphical illustration of an interface modulation spectrum 2102, including a latched value 2104, adjacent to indicia of various dynamic force range mapping schema in accordance with the various embodiments described above. More particularly, a dynamic force range element 2106 depicts a "one-to-one" mapping with respect to the entire modulation spectrum 2102, with the force range substantially centered about the latched value 2104. In an embodiment, once a modulation state is locked, subsequently applied force will not further modulate the interface parameter until the force value corresponding to the locked modulation value, referred to as the latched force value, is again achieved. When the latched force value is reached, the locked state becomes unlocked, allowing the full range of dynamic force to once again modulate the interface parameter.

FIG. 21 further illustrates a dynamic force range element 2108 mapped to an upper subset 2110 of spectrum 2102 above the latched state 2104, and a dynamic force range element 2114 mapped to a lower subset 2110 of spectrum 2102 below the latched state 2104. Note that the force range represented by element 2114 has a "reversed polarity" mapping orientation; that is, increasing pressure (force) modulates the interface parameter in the opposite direction from force range element 2108. In this way, whereas increasing force may "zoom in" when using normal polarity, increasing force may be used to "zoom out" in reverse polarity mode. In other embodiments the reverse polarity mode of operation may be used to reverse modulate virtually any desired interface parameter, e.g., video scrubbing, scrolling, browser history review, audio volume, and the like.

With continued reference to FIG. 21, a force range element 2116 is mapped to a subset of spectrum 2102 in the vicinity of latch point 2104. A force range element 2118 is mapped to a smaller subset of spectrum 2102 than element 2116, resulting in a correspondingly lower gain.

As briefly discussed above, the present disclosure contemplates force modulation of an interface parameter using a first input, suspending the modulation based on a second input, and thereafter effecting additional control over the modulated parameter through subsequent interaction with the sensing region by one or more of the first or additional inputs, and/or by a third input. Several illustrative examples of the foregoing aspect of the invention will now be described with reference to FIGS. 22-27.

Figure 22:
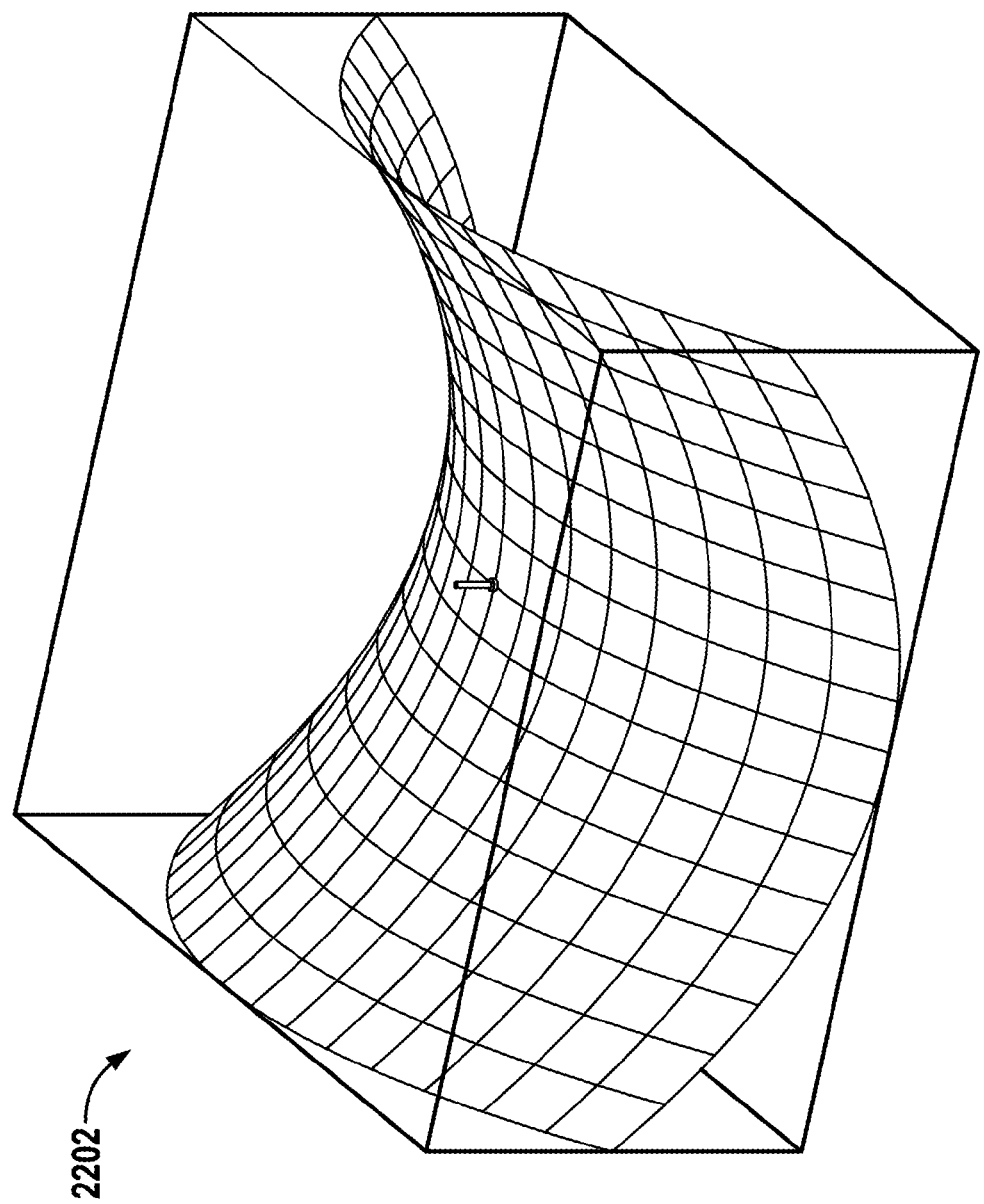
FIG. 22 is graphical illustration of an exemplary image shown at a minimum zoom level in accordance with an embodiment of the invention.
Figure 23:
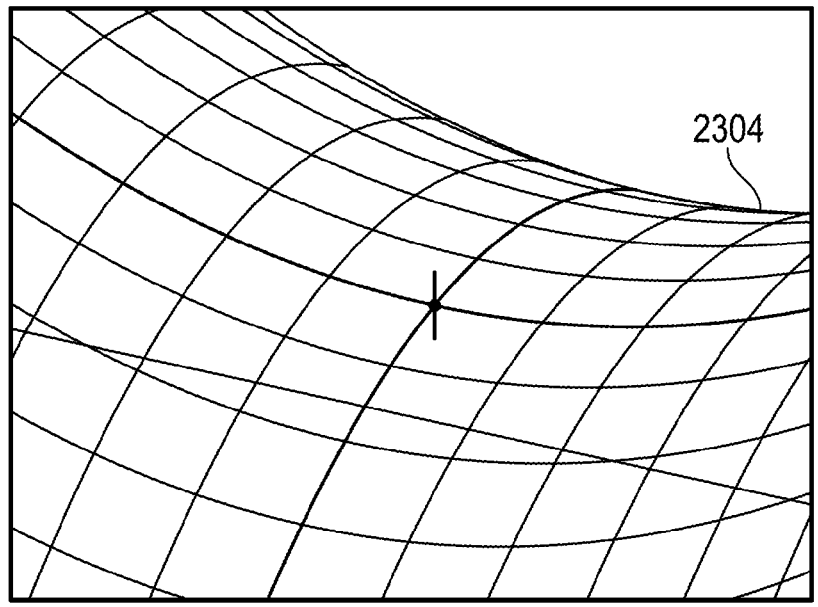
FIG. 23 shows the image of FIG. 22 at an increased zoom level in accordance with an embodiment of the invention.

FIG. 22 is graphical illustration of an exemplary image 2202 shown at a first zoom level in accordance with an embodiment of the invention. FIG. 23 shows a magnified portion 2304 of image 2202 of FIG. 22 at a second, increased zoom level. In the illustrated example, FIG. 23 represents a desired state of modulation. Accordingly, the user contacts the touch screen with an additional input (e.g., a second finger as shown in FIGS. 3 and 4) to lock the image.

Figure 24:
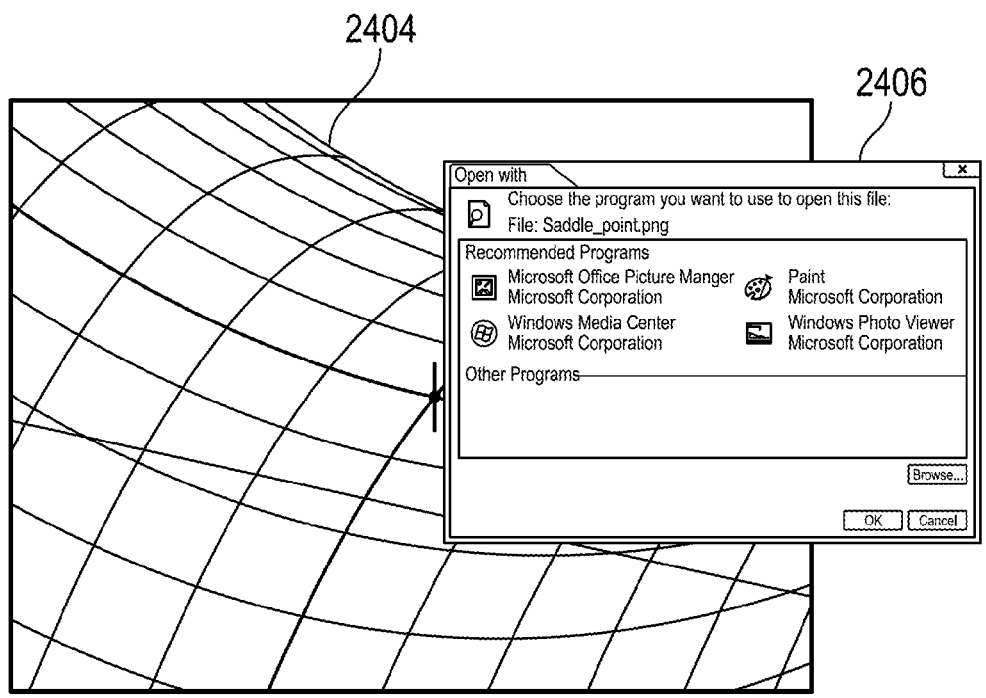
FIG. 24 shows the image of FIG. 22 locked at a desired zoom level by an additional input object contacting the touch surface, along with an associated menu rendered in accordance with an embodiment of the invention.

FIG. 24 shows an image 2404 (corresponding to image 2304 of FIG. 23), along with a context specific menu 2406 presented to the user on the display screen in response to the interaction with an input object with the sensing region subsequent to locking the image.

Figure 25:
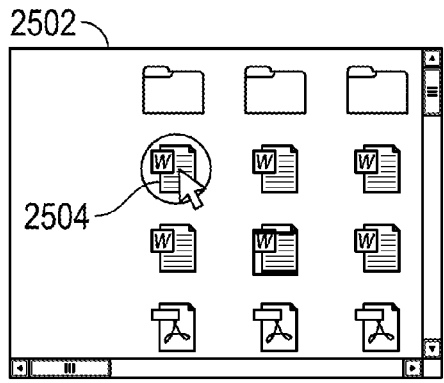
FIG. 25 is a graphical representation of a modulated user interface parameter latched at a desired by an additional input object contacting the touch surface in accordance with an embodiment of the invention.

FIG. 25 is a graphical representation of a modulated user interface parameter, such as a Windows Explorer™ file management application. In the illustrated example, force applied by a first input object may be used to modulate the file retrieval interface parameter by scrolling through a list of files. When the desired state is achieved, namely, when a particular file 2504 is highlighted, the user may lock the then current state of modulation by contacting the touch surface with an additional input object to thereby select file 2504 from the list displayed on the screen.

Figure 26:
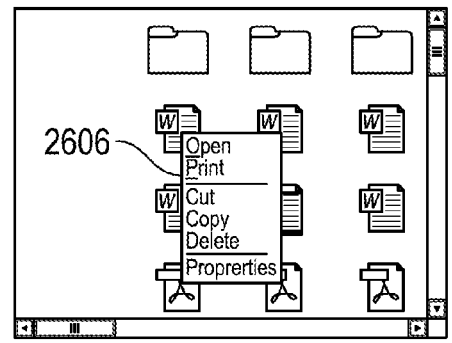
FIG. 26 is a graphical representation of the latched user interface parameter of FIG. 25 with an accompanying menu generated in response to a subsequent input object interacting with the touch surface in accordance with an embodiment of the invention.
Figure 27:
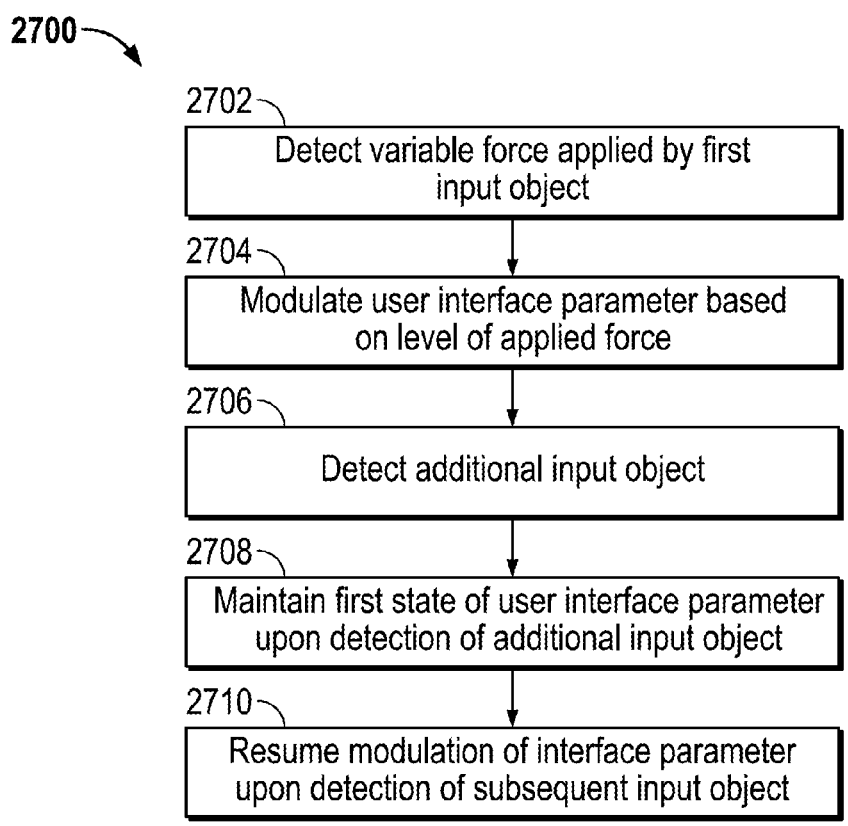
FIG. 27 is a flow chart illustrating a method of modulating a user interface parameter on a display screen using an input device of the type configured to determine positional and force information for input objects interacting with a sensing region in accordance with various embodiments of the invention.

FIG. 26 is a graphical representation of the latched user interface parameter of FIG. 25 with an accompanying menu 2606 presented to the user in response to a subsequent input object interacting with the touch surface FIG. 27 is a flow chart illustrating a method 2700 of modulating a user interface parameter on a display screen using an input device of the type configured to determine positional and force information for input objects interacting with a sensing region in accordance with various embodiments of the invention. More particularly, method 2700 involves detecting (Task 2702) a variable force applied to the touch surface by a first input object (e.g., a first finger). Method 2700 further involves modulating (Task 2704) the user interface parameter based on the amount of applied force. The method 2700 then detects (Task 2706) an additional input object (e.g., a second finger) contacting the touch surface when the first input is at a first force level and the user interface parameter is at a first state.

With continued reference to FIG. 27, the method 2700 further involves maintaining (Task 2708) the first state of the user interface parameter in response to the detection of the additional input object. Upon detecting a subsequent input object interacting with the sensing region, the method suitably resumes (Task 2710) modulating the user interface parameter.

Returning to FIG. 1, as was noted above the processing system 110 is further configured to operate at least one force sensor to generate force values that are indicative of force applied to an input surface. In general, the one or more force sensors are coupled to a surface and are configured to provide a plurality a measures of force applied to the surface. Such force sensor(s) can be implemented in a variety of different arrangements. To give several examples, the force sensor(s) can be implemented as multiple force sensors arranged near a perimeter of the sensing region 120. Furthermore, each of the force sensors can be implemented to measure compression force, expansion force, or both, as it is applied at the surface. Finally, a variety of different technologies can be used to implement the force sensors. For example, the force sensors can be implemented with variety of different technologies, including piezeoelectric force sensors, capacitive force sensors, and resistive force sensors.

In general, the force sensor(s) operate to provide signals to the processing system 110 that are indicative of force. The processing system 110 may be configured to perform a variety of actions to facilitate such force sensing. For example, the processing system 110 may perform a variety of processes on the signals received from the sensor(s). For example, processing system 110 may select or couple individual force sensor electrodes, calibrate individual force sensors, and determine force measurements from data provided by the force sensors.

The force sensor(s) are configured to each provide a measure of the force applied to the surface. A variety of different implementations can be used to facilitate this measurement. For example, the sensing element of the force sensor can be directly affixed to the surface. For example, the sensing element can be directly affixed to the underside of the surface or other layer. In such an embodiment, each force sensor can provide a measure of the force that is being applied to the surface by virtue of being directly coupled to the surface. In other embodiments, the force sensor can be indirectly coupled to the surface. For example, through intermediate coupling structures that transfer force, intermediate material layers or both. In any such case, the force sensors are again configured to each provide a measure of the force applied to the surface. In yet other embodiments the force sensors can be configured to directly detect force applied by the input object itself, or to a substrate directly above the force sensors.

In one specific example, the force sensor(s) can be implemented as contact—no contact sensors by being configured to simply indicate when contact is detected. Such a contact—no contact sensor can be implemented with a force sensor that identifies contact when detected force is above a specified threshold, and provides a simply binary output indicating that such contact has been detected. Variations in such contact—no contact sensors include the use of hysteresis in the force thresholds used determine contact. Additionally, such sensors can use averaging of detected force in determining if contact is occurring.

In general it will be desirable to position each of the plurality of force sensors near the perimeter edge of the sensor and to space the sensors to the greatest extent possible, as this will tend to maximize the accuracy of the sensing measurements. In most cases this will position the sensors near the outer edge of the sensing region. In other cases it will be near the outer edge of the touch surface, while the sensing region may extend beyond the surface for some distance. Finally, in other embodiments one or more the sensors can be positioned in the interior of the sensor.

It should be noted that many force sensors can be used to generate force values at relatively high rates compared to the rates at which images of sensor values can be generated. For example, in capacitive force sensors each force sensor can generate a forced value with relatively few capacitive measurements compared to the number of capacitive measurements required for each image, and thus force values can be generated at a relatively higher rate compared to rate at which images of sensor values can be generated. As will be described in greater detail below, the faster rate at which force values can be generated may be used to reduce errors in the positional information determined by the sensor. Specifically, the embodiments described herein can use the faster rate of force values to provide improved resistance to the effects of errors that may be caused by the motion of detected objects, and in particular, to the effect of aliasing errors. In such embodiments the faster rate of force values are used disambiguate determined position information for objects detected in the images of sensor values. This disambiguation of position information can lead to a reduction in the effects of aliasing errors and can thus improve the accuracy and usability of the input device. Furthermore, in other embodiments the force sensors can be provided to generate force values at the same rate at which capacitive images are generated. In these embodiments it will be generally desirable to control the force sensors such that the force values are generated between images such that the force values provide information regarding the contact of input objects between such images.

A variety of different techniques can be used to determine an initial contact location for an input object first detected in a first image of sensor values based at least in part on at least one force value preceding the first image of sensor values and the first image of sensor values. As one example, locations of the input object in the first image and the second image are used and the time difference between such images to estimate a rate of motion of the input object across the sensing region. By estimating the rate of motion of the input object, and the time that contact was detected using the force sensor, an estimate of the initial contact location can be determined.

As described above, the force values provided by the force sensors can be used with the images of sensor values to provide a variety of positional information. For example, positional information for an input object detected in a first image of sensor values based at least in part on the first image of sensor values and the force values. This positional information may be used to distinguish between a variety of different user interface actions. For example, determining if an input object detected in a first image of sensor values and an input object detected in a second image of sensor values performed a swipe across the input surface while remaining in contact with the input surface between the first image and the second image, or instead if the input object detected in the first image lifted from the input surface between the first image and the second image. As another example, determining if an initial contact location for an input object first detected in a first image of sensor values based at least in part on at least one force value preceding the first image of sensor values and the first image of sensor values.

The force values provide by the force sensors can also be used for additional functions. For example, one or more force values may themselves be used to generate positional information for the input object. This can be done using a variety of techniques, such as by estimating a deflection response or deformation response from the force values. Examples of these techniques are described in U.S. patent application Ser. No. 12/729,969, filed Mar. 23, 2010, entitled DEPRESSABLE TOUCH SENSOR; U.S. patent application Ser. No. 12/948,455, filed Nov. 17, 2010, entitled SYSTEM AND METHOD FOR DETERMINING OBJECT INFORMATION USING AN ESTIMATED DEFLECTION RESPONSE; U.S. patent application Ser. No. 12/968,000 filed Dec. 14, 2010, entitled SYSTEM AND METHOD FOR DETERMINING OBJECT INFORMATION USING AN ESTIMATED RIGID MOTION RESPONSE; and U.S. patent application Ser. No. 13/316,279, filed Dec. 9, 2011, entitled INPUT DEVICE WITH FORCE SENSING.

A system is thus provided which includes an input device configured to determine positional and force information for input objects interacting with a sensing region. The system is configured to: detect a variable force imparted to an input surface of the sensing region by at least one input object; dynamically modulate, within a modulation range, a user interface parameter in response to force information associated with the at least one input object; and modify the dynamic modulation of the interface parameter in response to an additional input object contacting the input surface.

In an embodiment, modifying the dynamic modulation of the interface parameter comprises latching the modulation level of the interface parameter. Moreover, when the force information is characterized by a dynamic force range, modifying the dynamic modulation of the interface parameter may comprise mapping the dynamic force range to a sub-set of the modulation range.

In a further embodiment, the modulation range has an increasing direction and a decreasing direction, wherein modifying the dynamic modulation of the interface parameter includes reversing the modulation direction.

In another embodiment, the dynamic modulation of the user interface parameter occurs in response to the force information associated with the at least one input object meeting an initial modulation threshold.

In another embodiment, the system is configured to dynamically modulate the interface parameter as a function of applied force, wherein modifying the dynamic modulation of the interface parameter comprises adjusting a gain value associated with the function. The system may be configured to dynamically modulate the interface parameter as either a linear or non-linear function of applied force.

The additional input object may characterized by one of the following positional contact signatures: a contact without release; a tap; a tap and hold; a double tap; and a tap and drag. The additional input object may also be characterized by one of the following force contact signatures: a light tap; a light tap and hold; a heavy tap; and a heavy tap and hold.

In an embodiment the system is configured to cease dynamically modulating the interface element upon detection of the additional object, and to resume dynamically modulating the interface element upon removal of the additional input object from the sensing region and the force information for the at least one input object meeting an initial modulation threshold. The at least one input object may be a first finger and the additional input object may be a second finger.

In an embodiment, the system is further configured to provide real time user feedback indicative of the current state of modulation of the interface parameter, and further, wherein the user interface parameter comprises at least one of: zooming; map navigation; audio volume; video scrubbing; word processing; text editing; browser history; scrolling; panning; nudging; feathering; photo editing; desktop display application; depth/3D display control; and email review.

In yet another embodiment, modifying the dynamic modulation of the user interface parameter may include presenting the user with a menu of selectable tasks associated with the user interface parameter. Moreover, the system may be configured to navigate the menu using at least one of force and positional information from the at least one input object imparting the variable force to the input surface, the additional input object contacting the input surface, or a third input object interacting with the sensing region subsequent to the additional input object contacting the input surface.

In another embodiment, modifying the dynamic modulation of the interface parameter comprises latching the then current state of the interface parameter, and wherein the system is further configured to present context specific control options for manipulating the then current state of the interface parameter using at least one of force and positional information from the at least one input object imparting the variable force to the input surface, the additional input object contacting the input surface, or a third input object interacting with the sensing region subsequent to the additional input object contacting the input surface.

In one embodiment, the force information is characterized by a dynamic force range; and modifying the dynamic modulation of the interface parameter comprises mapping the dynamic force range to a sub-set of the modulation range, the sub-set corresponding to one of a top region, a bottom region, or a mid-point of the modulation range.

In addition, modifying the dynamic modulation of the interface parameter may comprise latching a first state of the interface parameter, wherein the system is further configured to: maintain the first state of the interface parameter in response to force information from a third input object interacting with the sensing region below a latched force value; and resume dynamic modulation of the interface parameter in response to force information from a third input object interacting with the sensing region above the latched force value.

In another embodiment, dynamically modulating the user interface parameter comprises: modulating concentrically in response to force applied substantially orthogonal to the input surface; and modulating directionally in response to the at least one input object having a force or positional component substantially parallel to the input surface.

A method is also provided for modulating a user interface parameter on a display screen using an input device of the type configured to determine positional and force information for input objects interacting with a sensing region having an associated touch surface. The method includes: detecting a variable force applied to the touch surface by the at least one input object; modulating the user interface parameter as a function of the magnitude of the detected force from the at least one input object; detecting an additional input object contacting the surface when the at least one input object is at a first force value and the user interface parameter is at a first state; and in response to the detection of the additional input object, maintaining the user interface parameter in the first state.

In an embodiment, the method further includes detecting a subsequent input object interacting with the sensing region and resuming modulation of the user interface parameter as a function of the interaction of the subsequent input object with the sensing region.

Finally, a method is provided for navigating a menu displayed on a display screen using force applied to a touch screen associated with the display screen. The method includes: modulating a user interface parameter based on applied force from a first input object; displaying the menu in response to a second input object contacting the touch screen; and scrolling thru the menu based on at least one of force and positional information associated with the first or second input object.

In an embodiment, the further includes subsequently selecting a menu item based on at least one of force and positional information associated with at least one of the first and second input object, and/or canceling the menu upon lift off of the first or second input object.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A system comprising an input device configured to determine positional and force information for input objects interacting with a sensing region, the system configured to:
   detect a variable force imparted to an input surface of the sensing region by at least one input object;
   performing a dynamic modulation, within a modulation range, of a user interface parameter in response to the variable force associated with the at least one input object;
   detect, when the user interface parameter is at a first state from the dynamic modulation, an additional input object contacting the input surface after starting the dynamic modulation of the user interface parameter; and
   cease, in response to the additional input object contacting the input surface, the dynamic modulation of the user interface parameter at the first state.

2. The system of claim 1, wherein the performing the dynamic modulation modulation of the user interface parameter occurs in response to the force information associated with the at least one input object meeting an initial modulation threshold.

3. The system of claim 1, wherein the system is configured to perform the dynamic modulation of the user interface parameter as a function of applied force.

4. The system of claim 1, wherein the system is configured to perform the dynamic modulation of the user interface parameter as a linear function of applied force.

5. The system of claim 1, wherein the system is configured to perform the dynamic modulation of the user interface parameter as a non-linear function of applied force.

6. The system of claim 1, wherein the additional input object is characterized by one of the following positional contact signatures:
   a contact without release;
   a tap;
   a tap and hold;
   a double tap; and
   a tap and drag.

7. The system of claim 1, wherein the additional input object is characterized by one of the following force contact signatures:
   a light tap;
   a light tap and hold;
   a heavy tap; and
   a heavy tap and hold.

8. The system of claim 1, wherein the system is configured to resume the dynamic modulation of the interface element upon removal of the additional input object from the sensing region and the force information for the at least one input object meeting an initial modulation threshold.

9. The system of claim 1, wherein the at least one input object comprises a first finger and the additional input object comprises a second finger.

10. The system of claim 1, further configured to provide real time user feedback indicative of the current state of modulation of the user interface parameter.

11. The system of claim 1, wherein the user interface parameter comprises at least one of:
   zooming; map navigation; audio volume; video scrubbing; word processing; text editing;
   browser history; scrolling; panning; nudging; feathering; photo editing; desktop display application; depth/3D display control; and email review.

12. The system of claim 1, further comprising: presenting, in response to detecting the additional input object, the user with a menu of selectable tasks associated with the user interface parameter.

13. The system of claim 12, wherein the system is further configured to navigate the menu using at least one of force and positional information from the at least one input object imparting the variable force to the input surface, the additional input object contacting the input surface, or a third input object interacting with the sensing region subsequent to the additional input object contacting the input surface.

14. The system of claim 1, wherein the system is further configured to present context specific control options for manipulating the current state of the user interface parameter using at least one of force and positional information from the at least one input object imparting the variable force to the input surface, the additional input object contacting the input surface, or a third input object interacting with the sensing region subsequent to the additional input object contacting the input surface.

15. The system of claim 1, wherein the system is further configured to:
   maintain the first state of the user interface parameter in response to force information from a third input object interacting with the sensing region below a latched force value; and
   resume the dynamic modulation of the user interface parameter in response to force information from a third input object interacting with the sensing region above the latched force value.

16. The system of claim 1, wherein the dynamic modulation of the user interface parameter comprises:
   modulating concentrically in response to force applied substantially orthogonal to the input surface; and
   modulating directionally in response to the at least one input object having a force or positional component substantially parallel to the input surface.

17. A method of modulating a user interface parameter on a display screen using an input device of the type configured to determine positional and force information for input objects interacting with a sensing region having an associated touch surface, the method comprising:
   detecting a variable force applied to the touch surface by the at least one input object to obtain a detected variable force;
   modulating the user interface parameter as a function of the magnitude of the detected variable force from the at least one input object, wherein modulating the user interface parameter changes the user interface parameter to a first state based on the detected variable force;
   detecting an additional input object contacting the touch surface when the detected variable force is at a first force value and the user interface parameter is at the first state; and
   in response to the detection of the additional input object, maintaining the user interface parameter in the first state.

18. The method of claim 17, further comprising detecting a subsequent input object interacting with the sensing region and resuming modulation of the user interface parameter as a function of the interaction of the subsequent input object with the sensing region.

19. A method of navigating a menu displayed on a display screen using force applied to a touch screen associated with the display screen, the method comprising:
   modulating a user interface parameter to a first state based on applied force from a first input object;

displaying, in response to a second input object contacting the touch screen, the menu corresponding to the first state, the second input object initially detected after starting modulating the user interface parameter; and scrolling thru the menu based on at least one of force and positional information associated with the first input object or the second input object.

20. The method of claim 19, further comprising subsequently selecting a menu item based on at least one of force and positional information associated with at least one of the first and second input object.

21. The method of claim 19, further comprising canceling the menu upon lift off of the first or second input object.

\* \* \* \* \*